(12) United States Patent
Faibish et al.

(10) Patent No.: US 10,157,003 B1
(45) Date of Patent: Dec. 18, 2018

(54) STORAGE SYSTEM WITH DISTRIBUTED TIERED PARALLEL FILE SYSTEM COMPRISING SOFTWARE-DEFINED UNIFIED MEMORY CLUSTER

(71) Applicant: EMC Corporation, Hopkinton, MA (US)

(72) Inventors: Sorin Faibish, Newton, MA (US); Dominique Cote, Cambridge, MA (US); Sassan Teymouri, Saratoga, CA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 212 days.

(21) Appl. No.: 14/973,281

(22) Filed: Dec. 17, 2015

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 11/14* | (2006.01) |
| *G06F 11/20* | (2006.01) |

(52) U.S. Cl.
CPC ............ *G06F 3/0619* (2013.01); *G06F 3/065* (2013.01); *G06F 3/0644* (2013.01);
(Continued)

(58) Field of Classification Search
CPC ...... G06F 3/067; G06F 3/0613; G06F 3/0647; G06F 15/167; G06F 15/16; G06F 11/1471; G06F 11/2087; G06F 2201/84; G06F 3/0605; G06F 3/061; G06F 3/0635; G06F 3/0659; G06F 3/0661; H04L 49/101; H04L 49/3027; H04L 49/357; H04L 12/433
(Continued)

(56) References Cited

U.S. PATENT DOCUMENTS

| | | | |
|---|---|---|---|
| 8,452,931 B1 * | 5/2013 | Rokade | G06F 11/2094 711/112 |
| 2013/0226887 A1 * | 8/2013 | Braam | H04L 67/1097 707/697 |

(Continued)

OTHER PUBLICATIONS

EMC: VIPR services storage engine architecture white paper, Sep. 2014.*

(Continued)

*Primary Examiner* — Mohamed Gebril
(74) *Attorney, Agent, or Firm* — Ryan, Mason & Lewis, LLP (57) ABSTRACT

An apparatus in one embodiment comprises a storage system having a plurality of object storage servers. A software-defined storage controller of the storage system configures a unified memory cluster accessible to each of the plurality of object storage servers. The object storage servers collectively implement a distributed tiered parallel file system, such as a distributed tiered Lustre file system. The unified memory cluster may comprise portions of respective flash memories of a plurality of nodes of the storage system where each of the nodes comprises a corresponding one of the object storage servers. Objects stored in the flash memory of one of the nodes are mirrored into the flash memories of one or more other ones of the nodes under the control of the software-defined storage controller.

20 Claims, 4 Drawing Sheets

(52) U.S. Cl.
CPC ........ *G06F 3/0688* (2013.01); *G06F 11/1435* (2013.01); *G06F 11/1464* (2013.01); *G06F 11/2058* (2013.01); *G06F 11/2069* (2013.01); *G06F 2201/84* (2013.01)

(58) Field of Classification Search
USPC .......................................................... 711/162
See application file for complete search history.

(56) References Cited

U.S. PATENT DOCUMENTS

| | | | |
|---|---|---|---|
| 2013/0227194 A1 | 8/2013 | Kannan et al. | |
| 2014/0214998 A1* | 7/2014 | Lentini | H04L 47/70 709/212 |
| 2014/0229951 A1* | 8/2014 | Zhang | G06F 9/445 718/100 |
| 2014/0289191 A1* | 9/2014 | Chan | G06F 9/54 707/610 |
| 2015/0058291 A1* | 2/2015 | Earl | G06F 17/30144 707/625 |
| 2016/0359955 A1* | 12/2016 | Gill | G06F 9/45558 |
| 2017/0149843 A1* | 5/2017 | Amulothu | G06F 9/45558 |
| 2018/0060050 A1* | 3/2018 | Christopher | G06F 8/52 |

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System.".

Adam Moody, "Overview of the Scalable Checkpoint / Restart (SCR) Library," S&T Principal Directorate—Computation Directorate, Oct. 14, 2009, 33 pages.

* cited by examiner

STORAGE SYSTEM WITH DISTRIBUTED TIERED PARALLEL FILE SYSTEM COMPRISING SOFTWARE-DEFINED UNIFIED MEMORY CLUSTER

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include storage systems in which a plurality of object storage servers collectively provide a distributed tiered parallel file system. The object storage servers each have access to a unified memory cluster implemented utilizing software-defined storage functionality. For example, a given unified memory cluster may be implemented under software-defined storage control using respective portions of flash memories of a plurality of nodes of the storage system.

In one embodiment, an apparatus comprises a storage system having a plurality of object storage servers. A software-defined storage controller of the storage system configures a unified memory cluster accessible to each of the plurality of object storage servers. The object storage servers collectively implement a distributed tiered parallel file system, such as a distributed tiered Lustre file system. The software-defined storage controller is implemented using at least one processing device comprising a processor coupled to a memory.

By way of example, the unified memory cluster may comprise portions of respective flash memories of a plurality of nodes of the storage system where each of the nodes comprises a corresponding one of the object storage servers. Objects stored in the flash memory of one of the nodes are mirrored into the flash memories of one or more other ones of the nodes under the control of the software-defined storage controller.

The software-defined storage controller may be implemented in a distributed manner so as to comprise software-defined storage modules implemented on respective ones of the nodes of the storage system.

The object storage servers can be implemented in respective Linux containers running on respective ones of the nodes.

Illustrative embodiments can provide significant improvements in terms of data access performance and scalability relative to conventional arrangements. For example, reduced data access latency can be provided and larger numbers of nodes supported than in conventional parallel file system implementations. Moreover, recovery time from a node failure is considerably reduced, as objects associated with a failed node can be made readily accessible on one or more other nodes without waiting for recovery of the failed node. Similar advantages are provided in other storage system arrangements.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
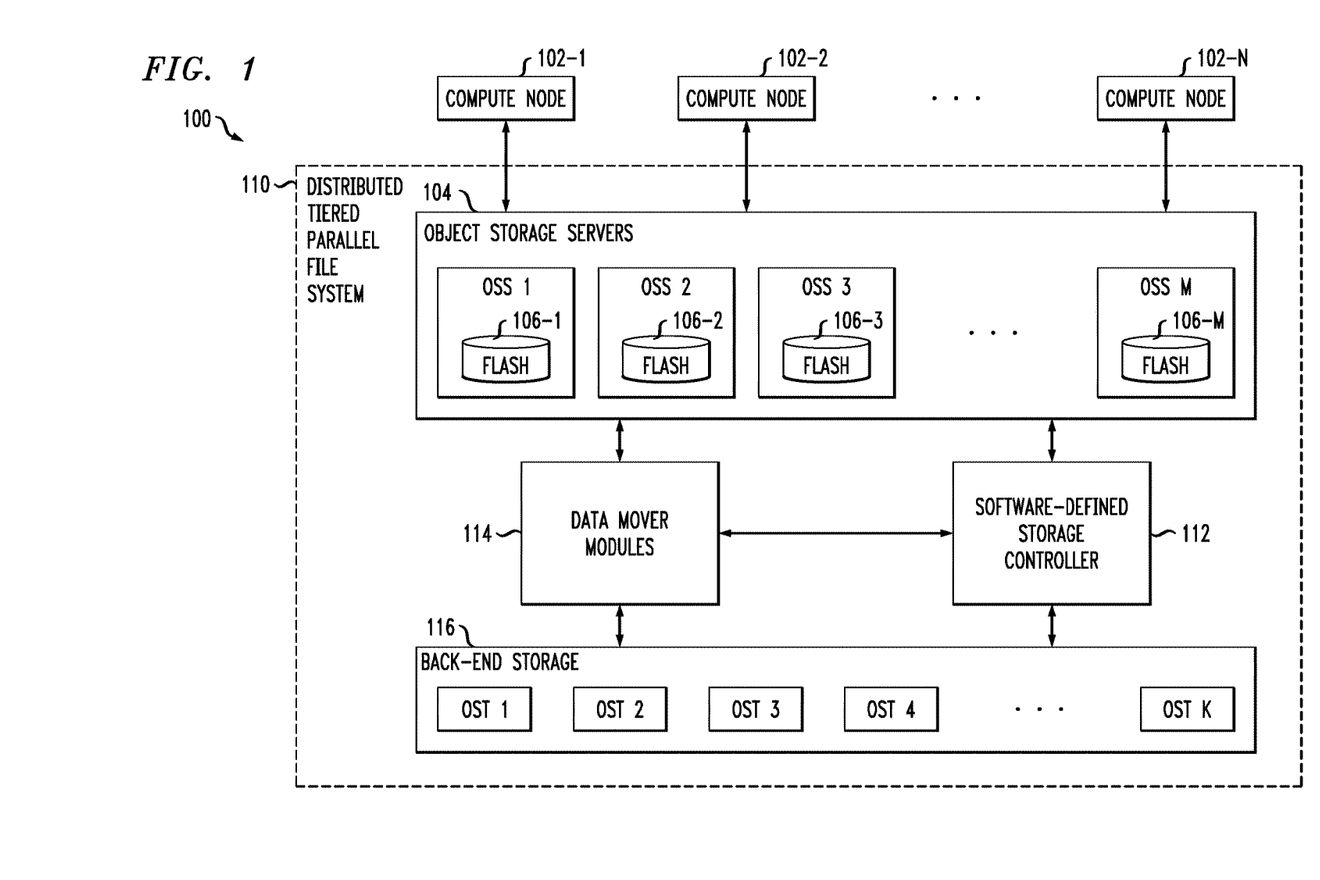
FIG. 1 is a block diagram of an information processing system comprising a storage system that includes a distributed tiered parallel file system having a unified memory cluster implemented using software-defined storage functionality in an illustrative embodiment of the invention.

FIG. 1 shows an information processing system 100 configured in accordance with an illustrative embodiment of the present invention. The information processing system 100 comprises compute nodes 102-1, 102-2, . . . 102-N that communicate with a plurality of object storage servers 104 of a storage system. The storage system is assumed in this embodiment to comprise a plurality of storage system nodes that are separate from the compute nodes 102 and that implement respective ones of the object storage servers 104.

The compute nodes 102 in some embodiments comprise respective analysis nodes that run respective analytics applications utilizing data stored in the distributed tiered parallel file system 110 comprising object storage servers 104. Numerous other types of compute nodes can be used in other embodiments, including various combinations of multiple compute nodes of different types. At least a subset of the compute nodes 102 in some implementations can comprise virtual machines or containers running in cloud infrastructure.

The object storage servers 104 more particularly comprise object storage servers denoted OSS 1, OSS 2, OSS 3, . . . OSS M. The object storage servers OSS 1 through OSS M comprise respective flash memories 106-1, 106-2, 106-3, . . . 106-M, although additional or alternative electronic memory types, or combinations thereof, can be used in other embodiments. The object storage servers 104 collectively implement a distributed tiered parallel file system 110, which is assumed to be a distributed tiered Lustre file system. The variables N and M in this embodiment are assumed to be arbitrary distinct integers each greater than one.

Conventional aspects of Lustre file systems suitable for use in conjunction with implementation of one or more features of the distributed tiered parallel file system 110 in some embodiments are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

The storage system comprising object storage servers 104 further comprises a software-defined storage controller 112, data mover modules 114 and back-end storage 116. The back-end storage 116 comprises respective object storage targets of the object storage servers 104. The object storage targets are more particularly denoted as object storage targets OST 1, OST 2, OST 3, . . . OST K. The variable K is also assumed to be an arbitrary integer greater than one, and is generally equal to or greater than M. More particularly, each of the M OSSs may have two or more OSTs associated therewith. For example, in some implementations, each of the OSSs may support about four to eight OSTs.

The software-defined storage controller 112 is configured to implement a unified memory cluster accessible to each of the object storage servers 104 of the storage system. This unified memory cluster is part of the distributed tiered parallel file system 110 and illustratively comprises at least portions of respective ones of the flash memories 106 of the object storage servers 104. The unified memory cluster in this embodiment is "unified" in that it serves as a single common storage pool configured by the software-defined storage controller 112 for utilization by all of the object storage servers 104.

The object storage servers 104 in the present embodiment are assumed to be interconnected with one another using high-speed connections. For example, data can be moved between the flash memories 106 of the object storage servers 104 under the control of the software-defined storage controller 112 using remote direct memory access (RDMA) connections over 40 Gigabit Ethernet (40 GbE) or InfiniBand (IB). Numerous other types of connections and associated data transfer protocols can be used in other embodiments.

As indicated above, the software-defined storage controller 112 is assumed to be part of the storage system that in the FIG. 1 embodiment further comprises the object storage servers 104, the data mover modules 114 and the back-end storage 116. Such a storage system or individual portions thereof are further assumed to be configured for communication with the compute nodes 102 over at least one network although such networks are not explicitly shown in the figure. The back-end storage 116 illustratively comprises a storage array or other types and arrangements of storage drives. For example, in some embodiments the back-end storage 116 of the distributed tiered parallel file system 110 can comprise a collection of local disks of storage system nodes that implement the respective object storage servers 104.

The software-defined storage controller 112 in some embodiments is implemented using software-defined storage products such as ScaleIO™ or ViPR® both of which are commercially available from EMC Corporation of Hopkinton, Mass.

For example, implementations utilizing ScaleIO™ for the software-defined storage controller 112 can advantageously support hundreds or thousands of nodes, potentially providing a single memory pool with a capacity on the order of a petabyte (PB). Such an arrangement overcomes scalability limitations inherent in certain conventional storage systems. Also, failure protection functionality provided by ScaleIO™ can be used to protect the distributed tiered parallel file system 110 from failures in one or more of the object storage servers 104.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The data mover modules 114 are illustratively configured to move data between the flash memories 106 of the object storage servers 104 and the back-end storage 116. The OSTs of the back-end storage 116 illustratively comprise one or more object stores, or other types of object storage. Each of the object stores is configured to store data in the form of objects having respective object identifiers (OIDs).

It should be noted that software-defined storage may also be used for one or more object stores or other portions of the back-end storage 116. In such an arrangement, first and second different sets of software-defined storage parameters can be used for the set of object storage servers 104 and for the back-end storage 116.

In some embodiments, the back-end storage 116 comprises a software-defined storage pool implemented, for example, using respective local disks or other direct-attached storage devices of a plurality of nodes of the storage system wherein each of the nodes comprises a corresponding one of the object storage servers 104. Additionally or alternatively, the back-end storage 116 can be implemented at least in part utilizing one or more storage arrays.

System components such as software-defined storage controller 112 and data mover modules 114 that are shown as separate from the object storage servers 104 in the FIG. 1 embodiment can be implemented at least in part within the same storage system nodes that implement the object storage servers 104. For example, as will be described elsewhere herein, the software-defined storage controller 112 can be implemented in a distributed manner using nodes that also implement respective ones of the object storage servers 104. The data mover modules 114 can similarly be implemented in a distributed manner using the same nodes that are used to implement respective ones of the object storage servers 104.

A given "node" of a storage system as the term is used herein is intended to encompass an IO node, a data node, a metadata node, or another type of node providing access to at least one of data and metadata for one or more associated compute nodes. The term "compute node" is also intended to be broadly construed, and generally encompasses a system node that runs at least a portion of at least one application.

Storage system nodes utilized to implement respective object storage servers 104 in some embodiments comprise respective DSSD™ server-based flash storage devices, also from EMC Corporation. Accordingly, at least portions of one or more of the flash memories 106 of the respective object storage servers 104 can be implemented using DSSD™ server-based flash storage devices. A wide variety of other types of server-based flash storage devices can be used in other embodiments, as will be apparent to those skilled in the art. References herein to DSSD™ storage devices are by way of example only.

The data mover modules 114 may be configured to control movement of data between the flash memories 106 and the back-end storage 116 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 114 can communicate with the software-defined storage controller 112 and back-end storage 116 via one or more networks or other types of communication media. In distributed implementations, different modules or other portions of a given distributed system component such as software-defined storage controller 112 or data mover modules 114 can be implemented in respective ones of the storage system nodes that are used to implement the object storage servers 104.

As noted above, the compute nodes 102 are assumed to communicate with the storage system over at least one network, which is not explicitly shown in the figure. The compute nodes 102 may comprise respective computers in a cluster of computers associated with a supercomputer or other high performance computing (HPC) system. The term "compute node" as used herein is intended to be broadly construed, and such nodes in some embodiments may comprise respective analysis nodes or other types of compute nodes. Applications running on such nodes illustratively include what are referred to herein as "analysis applications" but such applications are also intended to be broadly construed.

Although shown as a separate component in this embodiment, the software-defined storage controller 112 in other embodiments can be implemented at least in part within the object storage servers 104.

As indicated previously, it is possible to implement the software-defined storage controller 112 in a distributed manner, with portions of the software-defined storage controller 112 possibly being implemented on respective nodes that comprise respective ones of the object storage servers 104. Other types of distributed implementations of the software-defined storage controller 112 are possible. The data mover modules 114 can similarly be implemented in a distributed manner, possibly using the same storage system nodes that are used to implement respective portions of the software-defined storage controller 112. These nodes illustratively comprise respective ones of the object storage servers 104.

It is to be appreciated that these and other features of illustrative embodiments are presented by way of example only, and should not be construed as limiting in any way.

Accordingly, different numbers, types and arrangements of compute nodes, object storage servers, software-defined storage controllers, data mover modules and back-end storage can be used in other embodiments.

The storage system comprising object storage servers 104, software-defined storage controller 112, data mover modules 114 and back-end storage 116 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The software-defined storage controller 112 and data mover modules 114, as well as other system components, may be implemented at least in part using processing devices of such processing platforms.

For example, in a distributed implementation of the software-defined storage controller 112, the software-defined storage modules of the distributed software-defined storage controller are implemented in respective LXCs running on respective ones of the nodes that also implement respective object storage servers 104.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only.

In other embodiments, only subsets of these components, or additional or alternative sets of components, may be used, and such components may exhibit alternative functionality and configurations.

For example, in another illustrative embodiment, the above-noted DSSD™ server-based flash storage devices can be used as respective additional flash memories for the compute nodes. A checkpoint could be written directly to the DSSD™ server-based flash storage device associated with a given compute node. That same DSSD™ server-based flash storage device can be used as the flash memory for an object storage server of the distributed tiered parallel file system. Thus, there would no need to move the checkpoint from the compute node to the object storage server. Instead, the checkpoint could just be tiered from the flash memory of the object storage server to the back-end storage. Such an arrangement can avoid the use of existing compute node memory for checkpointing and thereby allow additional compute node memory resources to be utilized by applications running on the compute nodes, while also avoiding checkpointing bottlenecks that might otherwise arise. This leads to improved overall performance, particularly for supercomputers and other HPC embodiments that include potentially large numbers of compute nodes.

The operation of the information processing system 100 will now be described in further detail with reference to the flow diagram of FIG. 2. The process as shown includes steps 200 through 206, and is suitable for use in the system 100 but is more generally applicable to other types of storage systems comprising distributed tiered parallel file systems implemented using object storage servers and an associated software-defined storage controller.

In step 200, a storage system is configured to include a plurality of object storage servers. The object storage servers may comprise, for example, Linux-based object storage servers. The object storage systems illustrative run on respective nodes of the storage system. The nodes may comprise, for example, data nodes, IO nodes or other types of nodes. The storage system also includes back-end storage. The back-end storage in some embodiments is configured to include one or more object stores.

In the context of the FIG. 1 embodiment, the storage system comprises object storage servers 104 having respective flash memories 106. The back-end storage 116 of the storage system is assumed to comprise at least one object store that stores objects in association with respective unique OIDs.

In step 202, a distributed tiered parallel file system is deployed using the object storage servers. For example, as illustrated in FIG. 1, the object storage servers OSS 1 through OSS M of the set of object storage servers 104 are utilized to deploy a distributed tiered parallel file system 110, illustratively a tiered Lustre file system, although other types of parallel file systems can be used in other embodiments. The distributed tiered parallel file system is utilized by the compute nodes 102 to read and write files within the storage system. The files are striped to objects on the OSTs by the corresponding OSSs. For example, a given file to be read or written by one or more of the compute nodes 102 is separated into multiple subfiles or stripes that are written by respective ones of the OSSs to the respective OSTs.

In step 204, a software-defined storage controller of the storage system is utilized to provide a unified memory cluster accessible to each of the object storage servers as part of the distributed tiered parallel file system. The unified memory cluster illustratively comprises portions of respective memories of storage system nodes used to implement respective ones of the object storage servers. For example, with reference to the illustrative embodiment of FIG. 1, the software-defined storage controller 112 of information processing system 100 implements a unified memory cluster comprising at least portions of respective flash memories 106 of the object storage servers 104. Other types of electronic memories or combinations thereof can be used in other embodiments.

As mentioned above, the software-defined storage controller in some embodiments comprises a ScaleIO™ software-defined storage controller or a ViPR® software-defined storage controller. Other types of software-defined storage controllers can be used in other embodiments, and such software-defined storage controllers can be part of or otherwise associated with a given storage system comprising at least one storage platform.

In step 206, objects from one portion of the unified memory cluster are mirrored to one or more other portions of the unified memory cluster under the control of the software-defined storage controller. With reference again to the FIG. 1 embodiment, a unified memory cluster illustratively comprises at least portions of respective flash memories 106 of respective storage system nodes used to implement respective ones of the object storage servers 104. The software-defined storage controller 112 is configured to mirror objects stored in the flash memory of one of the nodes into the flash memories of one or more other ones of the nodes.

In some embodiments, the unified memory cluster may be dynamically modified under the control of the software-defined storage controller responsive to node failures or other designated conditions. For example, the unified memory cluster may be configured to recover from a failure in the flash memory of one of the nodes by obtaining corresponding data from the flash memory of another one of the nodes. With reference to the FIG. 1 embodiment, the distributed tiered parallel file system 110 may be configured to recover from a failure in one of the nodes used to implement a corresponding one of the object storage servers 104 by obtaining corresponding data from the flash memory of another one of the nodes. Such failure recovery is assumed to be directed at least in part by the software-defined storage controller 112. A wide variety of other types of configuration or control of the unified memory cluster can be provided by the software-defined storage controller 112.

Figure 2:
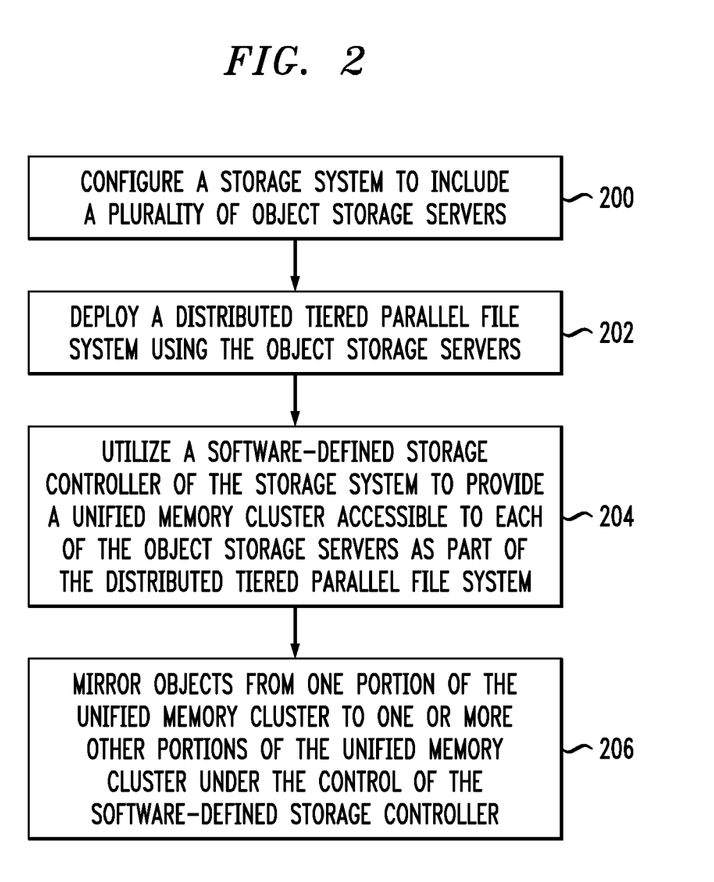
FIG. 2 is a flow diagram of an exemplary process for providing a distributed tiered parallel file system having a unified memory cluster implemented using software-defined storage functionality.

The particular processing operations and other system functionality described in conjunction with the flow diagram of FIG. 2 are presented by way of illustrative example only, and should not be construed as limiting the scope of the invention in any way. Alternative embodiments can use other types of processing operations involving object storage servers and an associated software-defined storage controller. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different distributed tiered parallel file systems within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising object storage servers and a software-defined storage controller will now be described with reference to FIGS. 3 and 4. In each of these embodiments, a software-defined storage controller is utilized to configure a unified storage space utilizing flash memories associated with respective ones of a plurality of object storage servers of a distributed tiered parallel file system, illustratively a distributed tiered Lustre file system. Furthermore, the software-defined storage controller in each of these illustrative embodiments is implemented in a distributed manner utilizing a plurality of software-defined storage modules implemented on respective storage system nodes that also implement the object storage servers 104. It is assumed that the distributed software-defined storage controller comprises a ScaleIO™ software-defined storage controller, although other types of controllers could be used.

Figure 3:
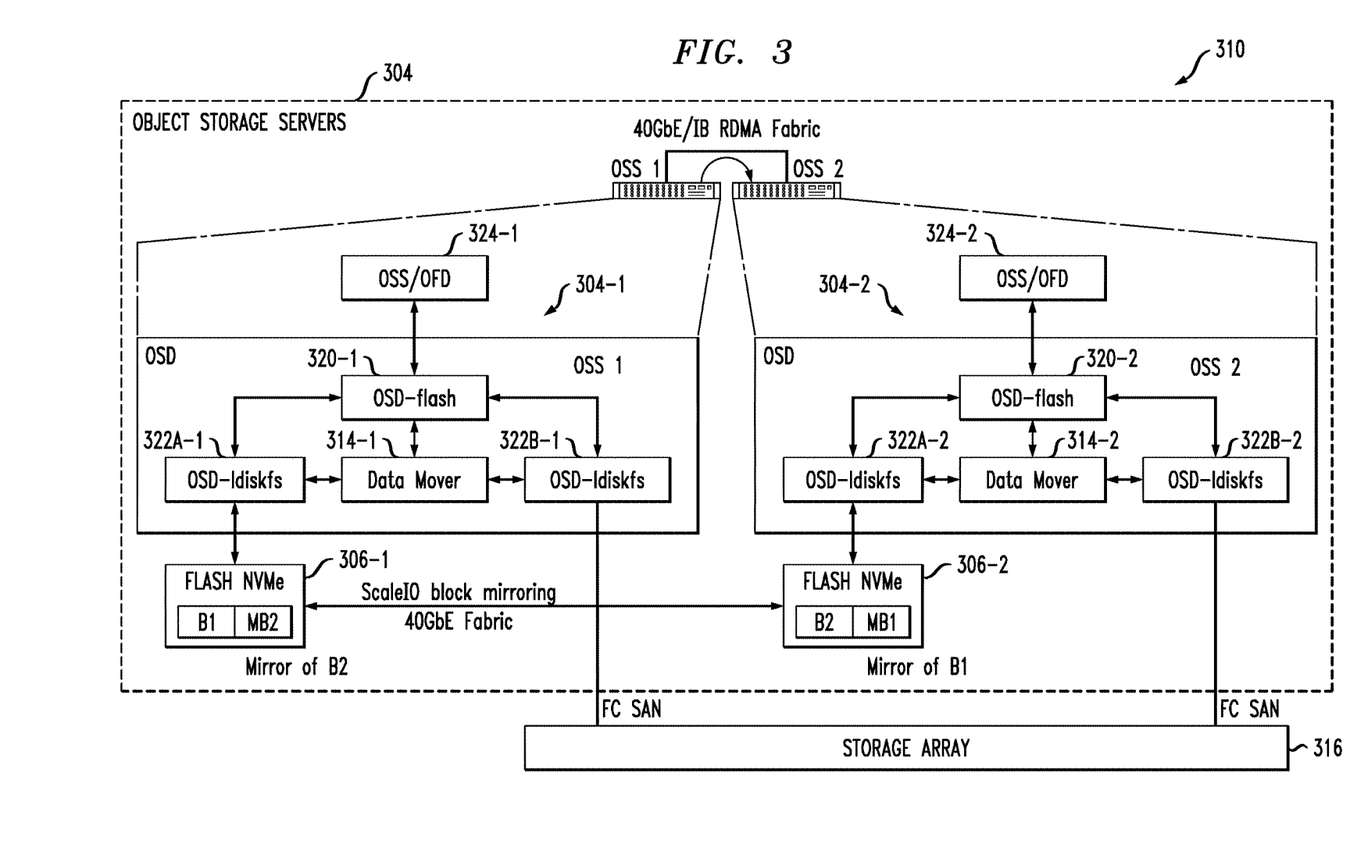
FIGS. 3 and 4 show respective additional illustrative embodiments of information processing systems comprising distributed tiered parallel file systems having unified memory clusters implemented using software-defined storage functionality.

Referring now to FIG. 3, an information processing system comprises a plurality of object storage servers 304 that are utilized to implement a distributed tiered parallel file system 310. The object storage servers 304 more particularly comprise a pair of object storage servers denoted OSS 1 and OSS 2. This pair of OSSs is implemented in an active-active configuration relative to one another. For example, in one possible active-active configuration, if one of the OSSs of the pair fails, the other OSS of the pair can take over the same storage volume used by the failed OSS. The distributed tiered parallel file system 310 is assumed to include additional pairs of OSSs with the OSSs of respective ones of such pairs also being implemented in active-active configurations relative to one another.

Each of OSS 1 and OSS 2 is associated in this embodiment with a corresponding object storage device or OSD. The OSD comprises at least one processing device having a processor coupled to a memory and implements various components of the corresponding OSS. It is also assumed that each OSS has a corresponding flash memory 306-1 or 306-2 that may be part of the OSS or its corresponding OSD, although the flash memories 306-1 and 306-2 are illustratively shown in the figure as being separate from respective OSS 1 and OSS 2 and their corresponding OSDs. An OSD implementing an OSS and associated flash memory may be viewed as an example of what is more generally referred to herein as a "node" of the storage system. In some embodiments, the object storage servers are implemented in respective containers running on respective ones of the nodes.

The flash memories 306 in this embodiment comprise flash Non-Volatile Memory express (NVMe) devices that communicate with their respective OSSs or associated OSDs via Peripheral Component Interconnect express (PCIe) connections. Other types of flash memories and connections can be used in other embodiments.

The distributed tiered parallel file system 310 further comprises back-end storage in the form of a storage array 316. This storage array is assumed to comprise one or more OSTs for each of the object storage servers 304, and is possibly implemented as one or more object stores that store variable-size objects in association with unique OIDs. In other embodiments, the storage array 316 can be replaced with a set of local disks of the storage system nodes that implement the respective OSSs. For example, as indicated previously, back-end storage can be implemented in the form of a ScaleIO™ software-defined storage pool comprising using respective local disks or other direct-attached storage devices of a plurality of nodes of the storage system wherein each of the nodes comprises a corresponding one of the object storage servers 304. These and other types of back-end storage can be used as part of a distributed tiered parallel file system in other embodiments.

The object storage servers 304 in this embodiment communicate via a Fibre Channel (FC) storage area network (SAN) with the storage array 316. Other types of networks can be used in other embodiments.

The object storage servers 304 also communicate with each other via a 40 GbE or IB RDMA fabric. This fabric is utilized, for example, in conjunction with mirroring of data blocks of flash memory 306-1 into flash memory 306-2, and vice-versa, under the control of the software-defined storage controller.

The object storage servers 304 comprise respective data mover modules 314-1 and 314-2. Accordingly, as indicated previously, the data mover modules 314 in this embodiment are implemented in a distributed manner, with respective ones of the modules being implemented within respective ones of the object storage servers 304.

The software-defined storage controller is also implemented in a distributed manner, and includes one or more components implemented in each of the object storage servers 304. For example, the object storage server 304-1 in this embodiment comprises an OSD-flash controller 320-1 coupled to first and second OSD-ldiskfs components 322A-1 and 322B-1 as illustrated. The first OSD-ldiskfs component 322A-1 is coupled between the OSD-flash controller 320-1 and the flash memory 306-1, and the second OSD-ldiskfs component 322B-1 is coupled between the OSD-flash controller 320-1 and the storage array 316, where "ldiskfs" denotes a local file system, illustratively comprising, for example, a version of an ext4 file system used to store Lustre objects. Alternative local file systems that can be used in a given embodiment include ZFS, XFS and other Linux file systems.

The OSD-flash controller 320-1 of the object storage server 304-1 is also coupled to an OSD/OFD interface 324-1, where OFD denotes an object front-end device that is presented as a single server interface to a client. Such a client illustratively comprises a Lustre client implemented on a compute node.

Similarly, the object storage server 304-2 in this embodiment comprises an OSD-flash controller 320-2 coupled to first and second OSD-ldiskfs components 322A-2 and 322B-2 as illustrated. The first OSD-ldiskfs component 322A-2 is coupled between the OSD-flash controller 320-2 and the flash memory 306-2, and the second OSD-ldiskfs component 322B-2 is coupled between the OSD-flash controller 320-2 and the storage array 316. The OSD-flash controller 320-2 is also coupled to an OSD/OFD interface 324-2.

The OSD-flash controllers 320-1 and 320-2 are coupled to respective ones of the data mover modules 314-1 and 314-2. The data mover modules 314 are also coupled to each of the OSD-ldiskfs components 322A and 322B on their respective ones of the object storage servers 304.

In the FIG. 3 embodiment, the ScaleIO™ software-defined storage controller provides a storage pool in the form of a unified memory cluster comprising the flash memories 306. This unified memory cluster in the present embodiment serves as an acceleration tier of the distributed tiered parallel file system 310. The acceleration tier allows the OSSs to achieve the IO bandwidth performance of flash memory. The OSSs also access a disk tier comprising logical units (LUNs) on the storage array 316. As noted above, in other embodiments the disk tier may alternatively comprise a software-defined storage pool implemented, for example, using respective local disks or other direct-attached storage devices of the storage system nodes that implement the respective OSSs.

The distributed parallel file system 310 is thus distributed over multiple OSSs but is also tiered in that it utilizes a flash tier in the form of the unified memory cluster and a disk tier comprising the storage array 316. Numerous other tiering arrangements can be used in other embodiments.

At least portions of the components 320 and 322 are assumed to comprise distributed components of the software-defined storage controller of the distributed tiered parallel file system 310. For example, distributed software-defined storage modules of the software-defined storage controller can be configured to install the OSD-ldiskfs components on the OSSs as respective local file systems. Other arrangements of distributed software-defined storage modules implemented on respective storage system nodes implementing respective object storage servers can be used in other embodiments.

In the FIG. 3 embodiment, the distributed software-defined storage controller illustratively implements a unified memory cluster comprising at least portions of respective flash memories 306-1 and 306-2 of the respective object storage servers 304-1 and 304-2. Moreover, the distributed software-defined storage controller is configured to mirror objects of one of the object storage servers 304 on one or more other ones of the object storage servers 304. For example, one or more objects stored in the flash memory 306-1 are mirrored into the flash memory 306-2, and one or more objects stored in the flash memory 306-2 are mirrored into the flash memory 306-2, under the control of the software-defined storage controller. Each such object illustratively comprises one or more data blocks, as the ScaleIO™ software-defined storage controller assumed to be utilized in this embodiment performs mirroring on a block basis.

As illustrated in the figure, data block B1 stored in flash memory 306-1 of OSS 1 is mirrored via ScaleIO™ block mirroring into the flash memory 306-2 of OSS 2, with the mirrored data block being denoted MB1. Similarly, data block B2 stored in flash memory 306-2 of OSS 2 is mirrored via ScaleIO™ block mirroring into the flash memory 306-1 of OSS 1, with the mirrored data block being denoted MB2. The movement of data blocks between the flash memories 306 illustratively utilizes the 40 GbE or IB RDMA fabric that interconnects the object storage servers 304. Accordingly, in this embodiment, the storage system nodes implementing the object storage servers 304 and associated flash memories 306 are assumed to communicate with one another using RDMA connections, and more particularly RDMA over 40 GbE or IB. These RDMA connections are assumed to support data transfer between the flash memories 306 of the object storage servers 304 using RDMA verbs. Other types of connections can be used in other embodiments.

With regard to RDMA connections, it should be noted that ScaleIO™ software can be extended to add support for RDMA verbs for clustering data between the storage system nodes. This may involve C++ translation of the ScaleIO™ code to recognize the lowest latency at each transfer but will typically not require any significant change to the ScaleIO™ software modules other than the libraries used.

The unified memory cluster implemented under the control of the software-defined storage controller and comprising at least portions of the respective flash memories 306 is accessible to each of the object storage servers 304. It comprises part of the distributed tiered parallel file system in this embodiment, and helps to ensure high availability of the distributed tiered parallel file system in the event of node failures. For example, the unified memory cluster comprising the flash memories 306 is illustratively configured to recover from a failure in of one of the nodes comprising one of the flash memories by obtaining corresponding objects from another one of the nodes comprising another one of the flash memories, under the control of the software-defined storage controller.

Figure 4:
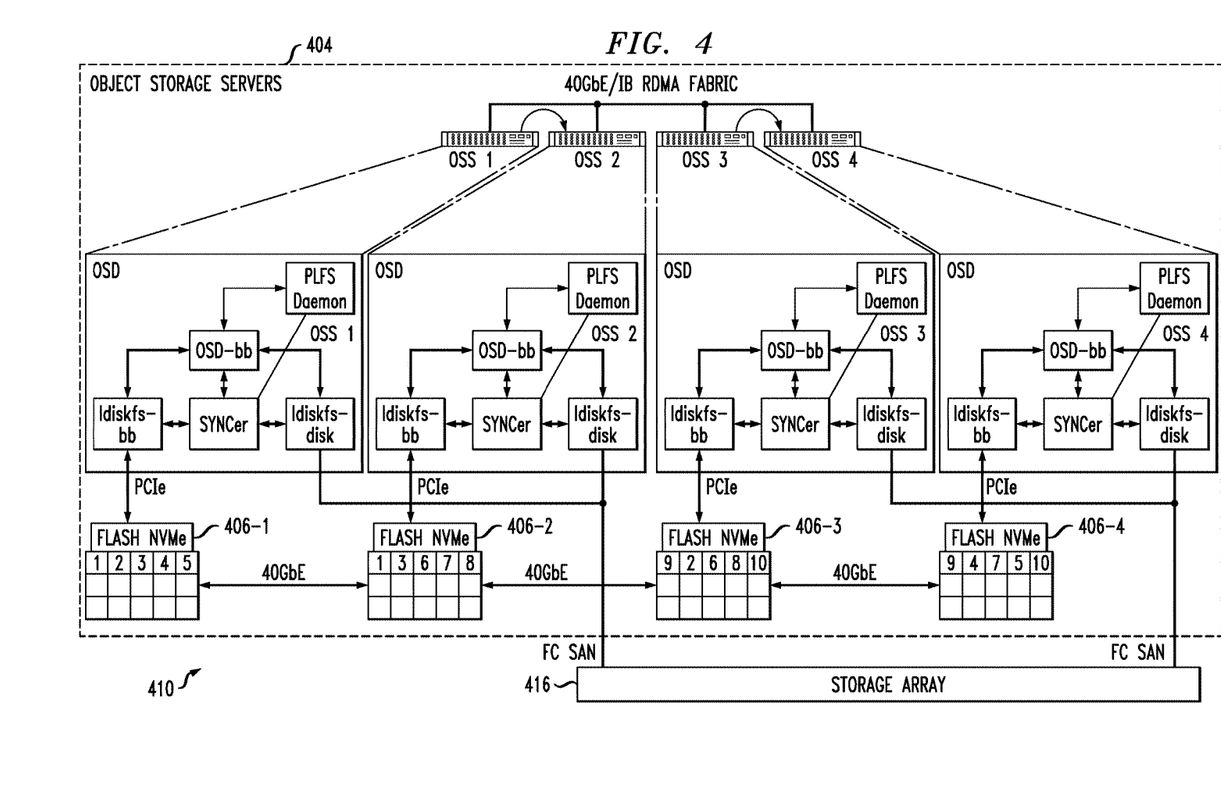

Another illustrative embodiment is shown in FIG. 4. In this embodiment, an information processing system comprises a plurality of object storage servers 404 that are utilized to implement a distributed tiered parallel file system 410. The object storage servers 404 more particularly comprise two pairs of object storage servers, including a first pair denoted OSS 1 and OSS 2 and a second pair denoted OSS 3 and OSS 4. The OSSs of each of these pairs are implemented in an active-active configuration relative to one another. The distributed tiered parallel file system 410 is assumed to include additional pairs of OSSs with the OSSs of respective ones of such pairs also being implemented in active-active configurations relative to one another.

Each of the object storage servers 404 is associated in this embodiment with a corresponding object storage device or OSD. The OSD comprises at least one processing device having a processor coupled to a memory and implements various components of the corresponding OSS. It is also assumed that each OSS has a corresponding flash memory 406-1, 406-2, 406-3 or 406-4 that may be part of the OSS or its corresponding OSD, although the flash memories 406 are illustratively shown in the figure as being separate from the respective OSSs and their corresponding OSDs. Again, an OSD implementing an OSS and associated flash memory may be viewed as an example of what is more generally referred to herein as a "node" of the storage system. As mentioned previously, the object storage servers may be implemented in respective containers running on respective ones of the nodes.

The flash memories 406 in this embodiment comprise flash NVMe devices that communicate with their respective OSSs or associated OSDs via PCIe connections. Other types of flash memories and connections can be used in other embodiments.

The distributed tiered parallel file system 410 further comprises back-end storage in the form of a storage array 416. This storage array is assumed to comprise one or more OSTs for each of the object storage servers 404, and is possibly implemented as one or more object stores that store variable-size objects in association with unique OIDs.

The object storage servers 404 in this embodiment communicate via FC SAN with the storage array 416. Other types of networks can be used in other embodiments.

The object storage servers 404 also communicate with each other via a 40 GbE or IB RDMA fabric. This fabric is utilized, for example, in conjunction with mirroring of data blocks of particular ones of the flash memories 406 into other ones of the flash memories 406 under the control of the software-defined storage controller.

Each of the object storage servers 404 comprises a plurality of components, including a data mover module in the form of a synchronization ("SYNCer") module. The SYNCer modules of the respective object storage servers 404 are illustratively configured to move data between the flash memories 406 and the storage array 416 via respective ldiskfs-bb and ldiskfs-disk components, where "bb" refers to the flash memory and "disk" refers to the storage array 416. Accordingly, as indicated previously, the data mover modules in this embodiment are implemented in a distributed manner, with respective ones of the modules being implemented within respective ones of the object storage servers 404.

The software-defined storage controller is also implemented in a distributed manner, and includes one or more components implemented in each of the object storage servers 404. For example, each object storage server comprises an OSD-bb controller coupled to the ldiskfs-bb and ldiskfs-disk components. Although not shown in the figure, an OSD/OFD interface may also be associated with each of the object storage servers 404.

In the FIG. 4 embodiment, the ScaleIO™ software-defined storage controller provides a storage pool in the form of a unified memory cluster comprising the flash memories 406. This unified memory cluster in the present embodiment serves as an acceleration tier of the distributed tiered parallel file system 410. The acceleration tier allows the OSSs to achieve the IO bandwidth performance of flash memory. The OSSs also access a disk tier comprising LUNs on the storage array 416. As mentioned previously, the disk tier may alternatively comprise a software-defined storage pool implemented, for example, using respective local disks or other direct-attached storage devices of the storage system nodes that implement the respective OSSs.

The distributed parallel file system 410 is thus distributed over multiple OSSs but is also tiered in that it utilizes a flash tier in the form of the unified memory cluster and a disk tier comprising the storage array 416. Again, numerous other tiering arrangements can be used in other embodiments.

At least portions of the OSD-bb controllers and associated sets of ldiskfs-bb and ldiskfs-disk components are assumed to comprise distributed components of the software-defined storage controller of the distributed tiered parallel file system 410. For example, as noted above, distributed software-defined storage modules of the software-defined storage controller can be configured to install the sets of ldiskfs components on the respective OSSs as respective local file systems. Other arrangements of distributed software-defined storage modules implemented on respective storage system nodes implementing respective object storage servers can be used in other embodiments.

Each of the object storage servers 404 in this embodiment further comprises a Parallel Log-Structured File System (PLFS) daemon coupled between the SYNCer component and the OSD-bb controller. PLFS can be used to facilitate the prefetching of data from the storage array 416 into the flash memories 406 within the storage system. Additional details regarding PLFS can be found in, for example, J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment. Accordingly, the PLFS daemons of the respective object storage servers 404 should be considered optional and can be removed.

In the FIG. 4 embodiment, the distributed software-defined storage controller illustratively implements a unified memory cluster comprising at least portions of respective flash memories 406 of the respective object storage servers 404. Moreover, the distributed software-defined storage controller is configured to mirror objects of one or more of the object storage servers 404 on one or more other ones of the object storage servers 404. For example, data objects 1, 2, 3, 4 and 5 stored in the flash memory 406-1 are mirrored into particular ones of the flash memories 406-2, 406-3 and 406-4. Again, each such object illustratively comprises one or more data blocks, as the ScaleIO™ software-defined storage controller assumed to be utilized in this embodiment performs mirroring on a block basis.

The software-defined storage controller in the FIG. 4 embodiment is illustratively configured to distribute the data blocks among the flash memories 406 in a balanced way that can maintain availability of the distributed tiered file system 410 in the event of at least one node failure and possibly multiple node failures, depending upon the particular number of OSSs utilized in a given implementation. The number of data blocks that are mirrored onto a given OSS are generally a small fraction of the total number of data blocks stored by that OSS. Accordingly, failure of a single OSS will not have an adverse impact on the performance of the other OSSs that each mirror only a small subset of the blocks of the failed OSS.

The movement of data blocks between the flash memories 406 illustratively utilizes the 40 GbE or IB RDMA fabric that interconnects the object storage servers 404. Accordingly, in this embodiment, the storage system nodes implementing the object storage servers 404 and associated flash memories 406 are assumed to communicate with one another using RDMA connections, and more particularly RDMA over 40 GbE or IB. These RDMA connections are assumed to support data transfer between the flash memories 406 of the object storage servers 404 using RDMA verbs. Other types of connections can be used in other embodiments.

The unified memory cluster implemented under the control of the software-defined storage controller and comprising at least portions of the respective flash memories 406 is accessible to each of the object storage servers 404. It comprises part of the distributed tiered parallel file system in this embodiment, and helps to ensure high availability of the distributed tiered parallel file system in the event of node failures. For example, the unified memory cluster comprising the flash memories 406 is illustratively configured to recover from a failure in of one of the nodes comprising one of the flash memories by obtaining corresponding objects from another one of the nodes comprising another one of the flash memories, under the control of the software-defined storage controller.

It should be noted that one or more metadata servers of the distributed tiered parallel file system 310 or 410 can be deployed in a similar manner as the object storage servers 304 or 404 in order to provide further protection of the distributed tiered parallel file system in the event of multiple node failures. The number of metadata servers in some embodiments is assumed to be a particular fraction of the number of object storage servers, such as ¼ or ⅛ the number of object storage servers. For example, in the FIG. 4 embodiment, an additional storage system node can be used to implement a metadata server for the four object storage servers 404. One or more metadata servers can be protected in a manner similar to that described previously for the object storage servers 404 by using a ScaleIO™ software-defined storage pool comprising flash memories of the storage system nodes implementing respective ones of the metadata and object storage servers.

It should also be understood that the particular node and component configurations illustrated in FIGS. 3 and 4 are presented by way of illustrative example only, and should not be construed as limiting in any way. Numerous alternative configurations of object storage servers, flash memories, software-defined storage controllers, back-end storage and other system elements can be used in other embodiments.

Illustrative embodiments disclosed herein can provide a number of significant advantages relative to conventional arrangements.

For example, one or more embodiments provide enhanced data access performance and scalability for object storage servers of a distributed tiered parallel file system, such as a distributed tiered Lustre file system. The performance of the distributed tiered Lustre file system in some implementations is accelerated by several orders of magnitude relative to conventional Lustre file system arrangements.

Another advantage in some embodiments is an enhanced ability to recover from node failures. For example, one or more embodiments based on ScaleIO™ software-defined storage exhibit substantially faster failure recovery times than conventional implementations. A unified memory cluster implemented using ScaleIO™ can allow rapid access to the same data on a different server or other storage system node responsive to a failure in one of the servers or other storage system nodes. Performance degradations due to such node failures are advantageously avoided, even in systems involving large numbers of object storage servers.

Yet another advantage of some embodiments is that checkpointing of the compute nodes is considerably facilitated relative to conventional arrangements, such as arrangements that involve checkpointing to local cache memory on the compute nodes. This advantage relative to conventional practice is particularly useful in supercomputers and other HPC embodiments that involve large numbers of compute nodes. Some embodiments of the invention avoid the use of existing compute node memory for checkpointing and thereby allow additional compute node memory resources to be utilized by applications running on the compute nodes, while also avoiding checkpointing bottlenecks that might otherwise arise. This improves the overall performance of supercomputers and other HPC embodiments.

Also, the use of containers to implement object storage servers as well as distributed modules and other components associated with a software-defined storage controller in some embodiments provides enhanced availability of a corresponding distributed tiered parallel file system while also facilitating migration of the functionality of a given container from one node to another in the event of a node failure.

These and other advantages are achieved in some embodiments without requiring expensive servers that each include very large memories, and therefore instead allow a given system to be configured using large numbers of smaller servers with less memory to form a unified memory cluster providing a single storage pool accessible to each of those servers.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, can be implemented as respective tenants of such a multi-tenant environment.

Back-end storage of a given system disclosed herein can also be implemented at least in part utilizing cloud infrastructure. Examples of cloud-based object stores that can be utilized for back-end storage in some illustrative embodiments include Amazon Web Services (AWS), Simple Storage Service (S3), Google Cloud Platform (GCP) Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102, object storage servers 104, software-defined storage controller 112 and data mover modules 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, distributed tiered parallel file systems, object storage servers, metadata servers, memory clusters, memories, software-defined storage controllers, data mover modules and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
a storage system comprising a plurality of object storage servers;
the storage system further comprising a software-defined storage controller configured to implement a unified memory cluster accessible to each of the plurality of object storage servers of the storage system;
the plurality of object storage servers collectively implementing a distributed tiered parallel file system;
the unified memory cluster being a part of the distributed tiered parallel file system;
wherein the unified memory cluster comprises portions of respective memories of a plurality of nodes of the storage system;
wherein each of the nodes comprises a corresponding one of the object storage servers;
wherein the object storage servers are implemented in respective virtualization infrastructure containers running on respective ones of the nodes;
wherein the containers do not comprise respective hypervisor-based virtual machines;
wherein a given one of the object storage servers comprises:
a flash memory controller;
a data mover module coupled to the flash memory controller; and
first and second local file system components associated with respective first and second tiers of the distributed tiered parallel file system;
the flash memory controller and the first and second local file system components being part of one of a plurality of distributed modules of the software-defined storage controller;
the data mover module being coupled between the first and second local file system components and operating in conjunction with the flash memory controller to control movement of data between the first and second tiers of the distributed tiered parallel file system;
the first tier comprising the unified memory cluster and the second tier comprising back-end storage; and
wherein the software-defined storage controller is implemented using at least one processing device comprising a processor coupled to a memory.

2. The apparatus of claim 1 wherein respective pairs of the object storage servers are implemented in active-active configurations relative to one another.

3. The apparatus of claim 1 wherein the software-defined storage controller is configured to mirror objects of one of the object storage servers on one or more other ones of the object storage servers.

4. The apparatus of claim 1 wherein object storage targets of respective ones of the object storage servers are implemented in back-end storage of the storage system.

5. The apparatus of claim 1 wherein the back-end storage comprises a software-defined storage pool implemented using respective direct-attached storage devices of the plurality of nodes of the storage system.

6. The apparatus of claim 1 wherein the storage system further comprises at least one metadata server and further wherein the unified memory cluster comprises a portion of a given one of the memories of a given one of the nodes of the storage system wherein the given node comprises the metadata server.

7. The apparatus of claim 1 wherein the portions of the respective memories comprise respective flash memories of those nodes.

8. The apparatus of claim 7 wherein objects stored in the flash memory of one of the nodes are mirrored into the flash memories of one or more other ones of the nodes under the control of the software-defined storage controller.

9. The apparatus of claim 1 wherein the nodes are configured to communicate with one another using remote direct memory access connections.

10. The apparatus of claim 1 wherein the unified memory cluster is configured to recover from a failure in of one of the nodes by obtaining corresponding objects from another one of the nodes under the control of the software-defined storage controller.

11. The apparatus of claim 1 wherein the software-defined storage controller is implemented in a distributed manner so as to comprise software-defined storage modules implemented on respective ones of the nodes.

12. The apparatus of claim 1 wherein the data mover module comprises a synchronization component.

13. An information processing system comprising the apparatus of claim 1.

14. A method comprising:
configuring a storage system to include a plurality of object storage servers;
deploying a distributed tiered parallel file system using the object storage servers; and
providing a unified memory cluster accessible to each of the object storage servers as part of the distributed tiered parallel file system;
wherein the unified memory cluster is implemented under the control of a software-defined storage controller of the storage system;
wherein the unified memory cluster comprises portions of respective memories of a plurality of nodes of the storage system;
wherein each of the nodes comprises a corresponding one of the object storage servers;
wherein the object storage servers are implemented in respective virtualization infrastructure containers running on respective ones of the nodes;
wherein the containers do not comprise respective hypervisor-based virtual machines;
wherein a given one of the object storage servers comprises:
a flash memory controller;
a data mover module coupled to the flash memory controller; and
first and second local file system components associated with respective first and second tiers of the distributed tiered parallel file system;
the flash memory controller and the first and second local file system components being part of one of a plurality of distributed modules of the software-defined storage controller;
the data mover module being coupled between the first and second local file system components and operating in conjunction with the flash memory controller to control movement of data between the first and second tiers of the distributed tiered parallel file system;
the first tier comprising the unified memory cluster and the second tier comprising back-end storage; and
wherein the configuring, deploying and providing are performed by at least one processing device comprising a processor coupled to a memory.

15. The method of claim 14 wherein the unified memory cluster comprises respective flash memories of the plurality of nodes of the storage system, and wherein the method further comprises:
mirroring objects stored in the flash memory of one of the nodes into the flash memories of one or more other ones of the nodes under the control of the software-defined storage controller; and
recovering from a failure in of one of the nodes by obtaining corresponding objects from another one of the nodes under the control of the software-defined storage controller.

16. A non-transitory processor-readable storage medium having stored therein program code of one or more software programs, wherein the program code when executed by at least one processing device causes said processing device:
to configure a storage system to include a plurality of object storage servers;
to deploy a distributed tiered parallel file system using the object storage servers; and
to provide a unified memory cluster accessible to each of the object storage servers as part of the distributed tiered parallel file system;
wherein the unified memory cluster is implemented under the control of a software-defined storage controller of the storage system;
wherein the unified memory cluster comprises portions of respective memories of a plurality of nodes of the storage system;
wherein each of the nodes comprises a corresponding one of the object storage servers;
wherein the object storage servers are implemented in respective virtualization infrastructure containers running on respective ones of the nodes;
wherein the containers do not comprise respective hypervisor-based virtual machines;
wherein a given one of the object storage servers comprises:
a flash memory controller;
a data mover module coupled to the flash memory controller; and
first and second local file system components associated with respective first and second tiers of the distributed tiered parallel file system;
the flash memory controller and the first and second local file system components being part of one of a plurality of distributed modules of the software-defined storage controller;
the data mover module being coupled between the first and second local file system components and operating in conjunction with the flash memory controller to control movement of data between the first and second tiers of the distributed tiered parallel file system;
the first tier comprising the unified memory cluster and the second tier comprising back-end storage.

17. The processor-readable storage medium of claim 16 wherein the unified memory cluster comprises respective flash memories of the plurality of nodes of the storage system, and wherein the program code when executed by at least one processing device further causes said processing device:
to mirror objects stored in the flash memory of one of the nodes into the flash memories of one or more other ones of the nodes under the control of the software-defined storage controller; and
to recover from a failure in of one of the nodes by obtaining corresponding objects from another one of the nodes under the control of the software-defined storage controller.

18. The method of claim 14 wherein the storage system further comprises at least one metadata server and further wherein the unified memory cluster comprises a portion of a given one of the memories of a given one of the nodes of the storage system wherein the given node comprises the metadata server.

19. The processor-readable storage medium of claim 16 wherein the storage system further comprises at least one metadata server and further wherein the unified memory cluster comprises a portion of a given one of the memories of a given one of the nodes of the storage system wherein the given node comprises the metadata server.

20. The processor-readable storage medium of claim 16 wherein the data mover module comprises a synchronization component.

* * * * *